INVENTORS
RICHARD B. BRIDGE
THOMAS E. MARSHALL, III

United States Patent Office 3,430,217
Patented Feb. 25, 1969

3,430,217
AUTOMATIC WEATHER INFORMATION
SENDING DEVICE
Richard B. Bridge, Greenbelt, Md., and Thomas E. Marshall III, Sterling, Va., assignors to the United States of America as represented by the Secretary of the Navy
Filed June 25, 1965, Ser. No. 467,152
U.S. Cl. 340—187  5 Claims
Int. Cl. G08c 9/00

ABSTRACT OF THE DISCLOSURE

This invention is directed to an automatic system for obtaining at least five different weather conditions and by a definite programmed sequence transmits the information to a remote receiver. A clock functions to provide a planned time sequence for obtaining and transmitting the information by use of electrical circuits in combination with separate rotatable drums upon which conductive Morse code symbols have been placed. The weather information is transmitted by a suitable transmitter in combination with the code symbols.

---

The invention described herein may be manufactured and used by or for the Government of the United States of America for governmental purposes without the payment of any royalties thereon or therefor.

The present invention relates to automatic weather stations adapted for use in automatically transmitting at timed intervals meteorological and/or oceanographic information from remote, inaccessible regions, or any desired regions, by use of a novel code and sequencing system.

Increased emphasis has been placed on obtaining local weather information by use of different types of data obtaining instruments. Heretofore, weather obtaining devices have been of various types such as those which: store data and physically retrieve the record periodically for review, store the data and collect and transmit data automatically on schedule by radio telemetry, or collect and store data and then transmit by radio telemetry on command by a radio signal. Some of the known automatic radio stations have been large and cumbersome and require permanent sheltering sheds in order to protect the power plant and instruments needed for the operation thereof. Some types used heretofore must be manned periodically in order to receive the information which prevents their use in remote areas. Other devices useable in remote areas have short life times and are therefore considered to be expensive compared to the information received therefrom.

The device of the present invention may be placed in a desired area on land or in water by manned operations or it may be delivered by aircraft by use of a parachute. Such a device is described in an article "Code and Sequencing System for Automatic Weather Stations" by T. E. Marshall, III and R. B. Bridge, N.R.L. Report 6092, published by the U.S. Naval Research Laboratory, Washington, D.C. 20390. Parachute drop instruments are capable of being dropped from aircraft and automatically transmitting information on meteorological conditions in inaccessible regions. The device then samples meteorological conditions, transmits the data in Morse code at specific time intervals such that the coded data may be received by standard ship, shore, or aircraft radio receivers without the requirement of any auxiliary recording equipment. As such, the device of the present invention may be left in any selected area to be unattended for relatively long periods of time with maximum transmission of weather data.

It is therefore an object of the present invention to provide an automatic weather station which is simple in design, light in weight, and of compact construction making use of a minimum number of parts.

Another object is to provide a weather station having a low power consumption with a fast response operating over a wide range of weather conditions.

Still another object is to provide a weather station adapted for transmitting information from any desired point at specific time intervals.

Yet another object is to provide a weather station which includes a system designed for ease of application, quality control and alignment, as well as for reliable trouble-free service.

While still another object is to provide a system which will accommodate a variety of transducer elements for obtaining and transmitting the necessary data.

Other objects, advantages, and features of the invention should become apparent from the following detailed description which is taken in conjunction with the accompanying drawings, in which.

The system of the present invention is adapted to transmit the values of the five weather functions; however, it is to be understood that the system may be provided with a greater or less number of functions than those specified. The system translates meteorological quantities of separate transducer elements to resistance. Thus, the output of each separate transducer represents a variable resistance between specific limits. The system translates the resistance of each separate transducer element to Morse code with an output of about 17 words (more or less) per minute in form of three-letter groups wherein the separate and different types of weather information are transmitted in a specific sequence beginning at a desired time interval. The first letter of the group identifies the information channel whereas the second and third letters provide the transducer readout which in the present system will be one of one hundred ninety-six possible two-character words, additional letters may be added or subtracted, as desired. In transmitting the information, a clock hour hand closes a circuit to a relay which energizes a time delay relay to the tubes of the telemeter system to give the tubes sufficient time to warm up prior to transmission. At the expiration of the warmup time, the internal programing system is activated and controls the equipment until the code sending time. The system generates a specific set of call letters, identifies the different channels, samples the separate meteorological quantities and selects the corresponding code for each variable. The system then automatically operates the keying relay to the transmitter to communicate this information in Morse code by means of a radio. Subsequent to sending all information the system turns off the telemeter and the internal programing system is set so that it is sequenced properly for the next transmission.

Figure 1:
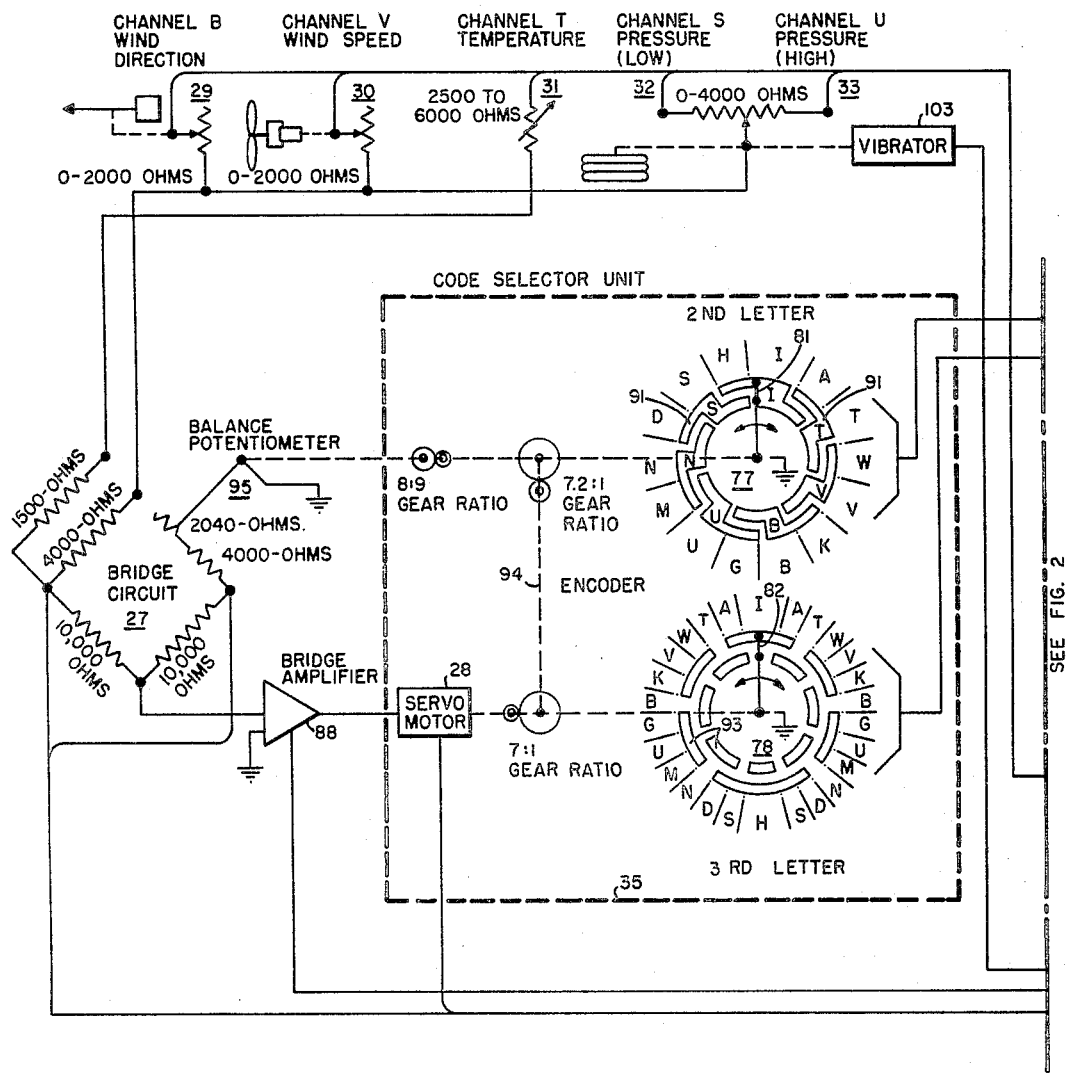
FIGS. 1 and 2 are a schematic and block diagram of the overall system.
Figure 2:
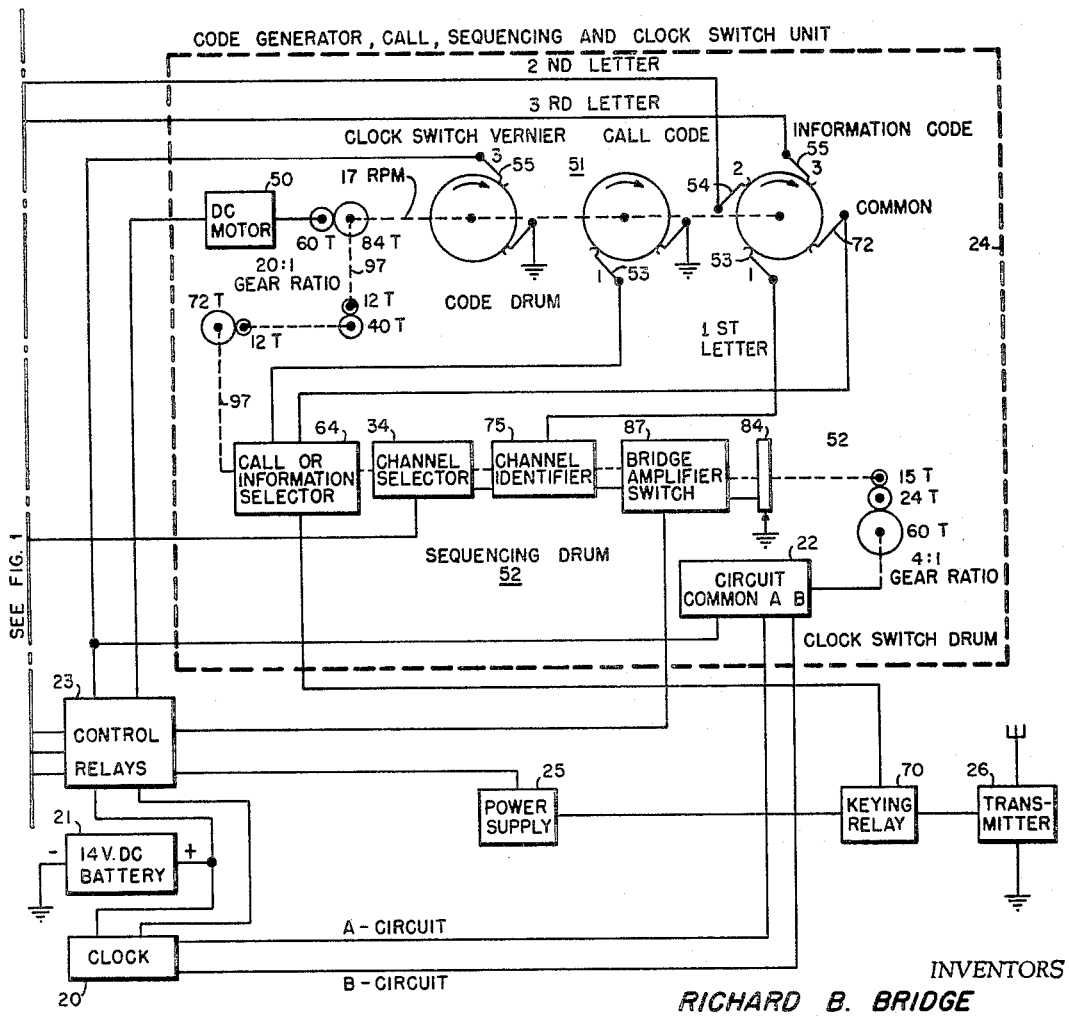

Now referring to the drawings wherein like reference characters represent like elements throughout the drawings, there is shown in FIGS. 1 and 2 a block diagram of the code and sequencing system of the present invention. As shown, FIGS. 1 and 2 are directed to a system which includes various operational elements that cooperate to obtain meteorological and/or oceanographic functions. The system changes these functions into a cyclic Morse code and telemeters the information to an appropriate receiver. The system includes a clock 20 powered by a 14 v. D.C. battery 21. The clock is electrically connected with a clock switch drum 22 and to a control relay 23. The control relay, after a slight delay for telemeter tube warmup, turns on a code generator, call, sequence and clock switch unit bounded by the dotted line rectangle 24. The control relay also controls a power supply 25 for a transmitter 26, for D.C. or A.C. bridge circuit 27, a servo-motor 28, and for the different weather determining transducers 29, 30, 31, 32, and 33 through the channel selector 34 within the sequencing drum portion of the block diagram which operates as a switch for the various functions. The code selector portion bounded by the dotted-line square 35 is connected with a code drum. A more detailed description of the various elements will be discussed later.

Figure 3:
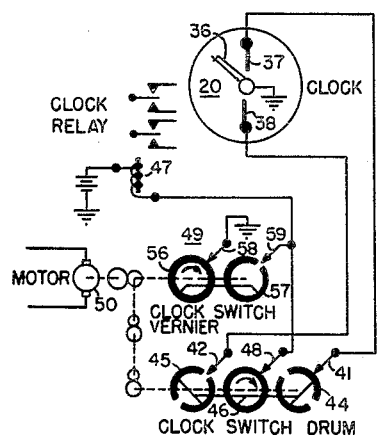
FIG. 3 is a schematic of the clock circuit.

FIG. 3 illustrates a schematic diagram of the clock circuit. As shown the clock 20 is provided with a rotatable hand 36 which is grounded to complete a circuit through opposing contacts or electrodes 37 and 38. Contacts 37 and 38 are electrically connected with brush contacts 41 and 42 respectively which are held in place by a brush holder 43, FIG. 4, in spring contact with the clock switch drum 22. The clock switch drum is provided with suitable contact tracks 44 and 45 about the circumference which are respectively in alignment with the brush contacts 41 and 42 and a center track 46 which is common to contact areas 44 and 45. The center track 46 is continuous around the entire circumference of the drum whereas tracks 44 and 45 are discontinued in specific areas such that brushes 41 and 42 completes an electrical circuit at different times over a portion of a revolution of the drum 22. As noted, each of the brushes 41 and 42 are in contact with the respective contact areas over a portion of a revolution of the drum. The drum is insulated from ground and is made such that a circuit with the clock is alternately connected to the clock relay coil 47 of the control relay 23 through a center spring brush contact 48. The drum is made such that the circuits are connected for a little less than one-four of a revolution, thereby allowing the clock switch vernier 49 to turn off the system. The clock switch vernier is a portion of the code drum which will be described later. As shown in the clock circuit schematic, a motor 50 drives a code generator drum 51 upon which the clock vernier contact is printed, the clock switch drum 22 and a sequencing drum 52 not shown in the clock-circuit schematic, through use of a suitable gearing system. The code-generator, call, sequencing, and clock-switch unit drums are assembled within the same housing holder one above the other and the drive gears driven by the motor are of specific ratio in order to rotate the drums as desired.

Figure 4:
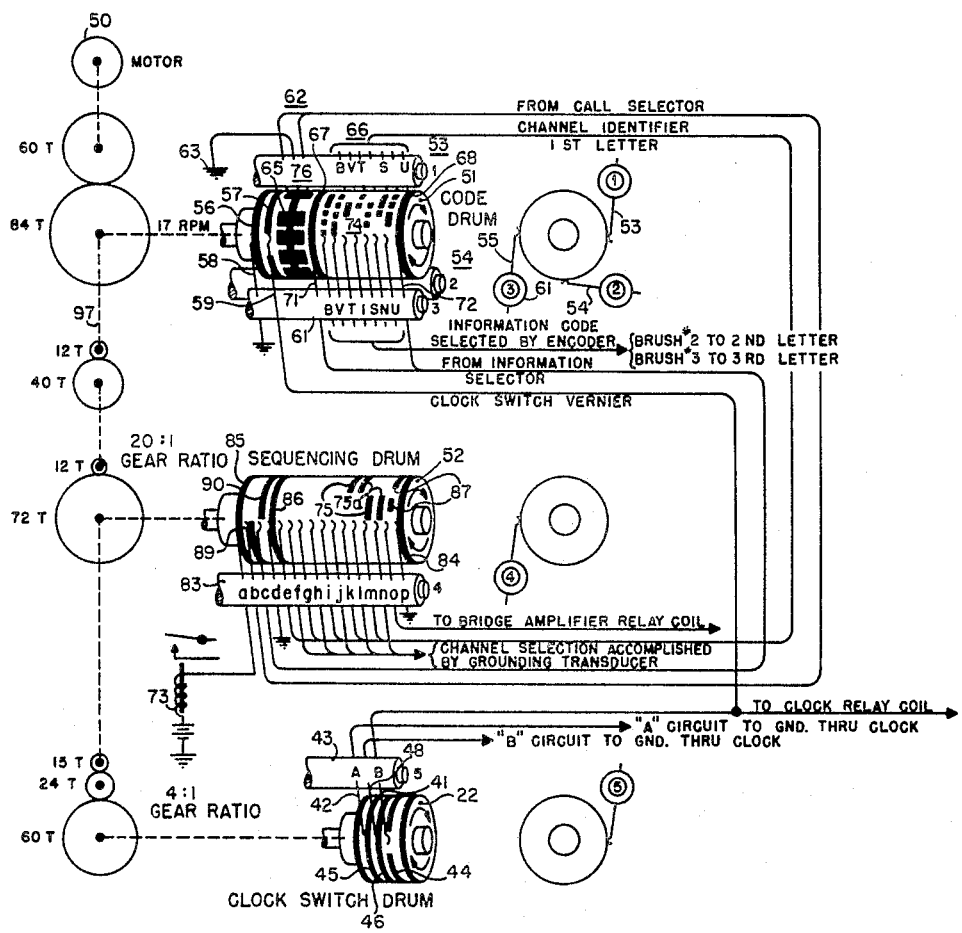
FIG. 4 is a diagrammatic illustration of the code generator, call, sequencing and clock switch units and keying relay coil of the system.
Figure 5:
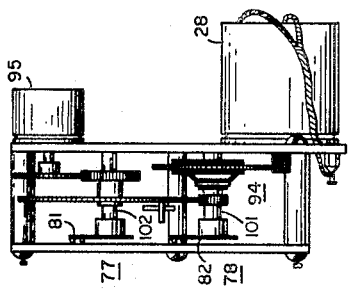
FIG. 5 illustrates the drive mechanism of the code selector unit.

The clock-switch vernier, call, and code drum 51, FIG. 4, has three sections arranged in any suitable order, all insulated from each other and ground. This drum has associated therewith three sets of brushes 53, 54 and 55 which contact the drum contact areas. The sets of brushes are spaced around the circumference of the drums such that there is 90° between sets 53 and 54 and 180° between sets 53 and 55. The association of each set of contacts with respect to the clock-switch vernier, call, and code drum and the rest of the circuit will follow hereinafter. The clock-switch vernier section 49, as shown, is located on one end of drum 51 in parallel with the clock-switch drum. The clock-switch vernier section is made up of a continuous track 56 around the drum and one section 57 which is broken or discontinuous. These two contact sections of the drum have associated therewith two brushes 58 and 59 located on brush holder 61 with one brush connected to clock relay coil 47 and the other to ground, with the ground brush being in contact with the continuous track 56 about the drum. The discontinuity in the circuit contact 57 acts as a precise switch to stop the system after brush 41 or 42 breaks contact with the clock switch drum track 44 or 45. The call code section is shown adjacent to the clock switch vernier.

The call code section 62 has associated therewith three brushes which contact the drum surface in which these brushes are located in the set of contacts 53. The center brush is, connected to ground 63 whereas the other two brushes are connected to call selector section 64 of the sequence drum 52. The call assigned the system is made by the brushes grounding contact bits 65 on the drum thereby closing the keying relay 70 as drum 51 passes the call contact brushes. The call code is made in three-letter groups, the first being a letter, the second a number, and the third a letter.

The channel identifier and information code section 66 of this drum has three sets of brushes 53, 54, and 55 contacting the drum as previously described. Since there are three sets of brushes, three letters are made for each revolution of the code drum, one letter for each set of brushes. The contact surfaces 67 and 68 shown on each end of the information code section 66 of the drum 51 is common or a continuous track around the entire drum. The brushes 71 and 72 contacting the track connect to the keying relay coil 73 through the sequence drum 52 call or information selector section 64. Code is made as the bits 74 on the drum pass a wiper contact that is grounded through the channel identifier contacts 75 on the sequencing drum or the code selector wipers in the encoder FIG. 1. The first letter identifies the channel with five brushes in brush holder 76, connecting with channel identified contacts 75 on the sequencing drum. These are grounded independently in order to indentify the five channels. In the particular device herein described the five channels are as follows, the letter B indicates the wind direction, V indicates the wind speed, T indicates air temperature, S indicates low pressure, U indicates high pressure. The next two letters represent the quantitative information which is obtained by use of two sets of brushes 54 and 55 including seven brushes each connected to output connectors of the two commutators 77 and 78 in the encoder illustrated in FIG. 1. The encoder has two double-prong radially displaced wiper contacts 81 and 82 in which each of these wipers grounds the appropriate brush leads or pair of brush leads 54 and 55 respectively for the information code portion 66 of the drum 51 to make the code selected for a particular variable.

The sequencing drum 52 is essentially a multiplexer that performs several functions. The drum 52 is provided with specially arranged contact surfaces on the circumference which makes contact with spring type contact brushes held in place by a brush holder 83 as the drum rotates. The channel selector 34, channel identifier 75, and bridge amplifier 87 contact surfaces are electrically inter-connected in common with a contact track 84 at one end about the circumference that connects with ground through its mating brush and a track 86 which is similarly grounded. The call or information selector section 64, contact surfaces 89 and 90 are inter-connected with a contact ring 85 which is connected electrically with the keying relay coil 73 which completes the circuit with the power supply to the transmitter. The contact surface 89 adjacent to the track 85 extends around the circumference for only 90° and is connected electrically with the call contacts of the code drum to feed the call information to the keying relay. The next conductive surface 90 extends about the circumference for the next 270° to feed the code information from the different codes to the keying relay for the different weather-transducer elements. The sequence drum is provided with five pairs of contact surfaces 75 and 75a of equal length (for ease of manufacture) around the circumference divided over the 270° in which one contact of each pair is electrically connected to specific contacts of contact brushes 53 to complete a circuit to the channel identifier and through contact 85 to the keying relay. The other contact of the pair connects with one of the transducers to connect that transducer into the Wheatstone bridge circuit. A third contact 87 on the drum corresponding to each pair of contacts acts as a switch to ground, to energize the bridge amplifier 88 (FIG. 1) to the servo-motor 28 that controls the contact movement of the code selector switches 77 and 78. The third contact surface starts a little later than the contact for the channel identifier and channel selector contacts to provide a delay for energizing the servo-motor. The third contact surface is shorter than the pair of contact surfaces since the motor is energized only long enough to balance the bridge circuit. During the 270 degree rotation period, (1) the proper brushes from the brush contacts 53 in contact with the code drum are connected to ground to complete the circuit to identify the channel of weather information being transmitted, (2) a circuit is completed to connect the proper weather-transducer resistance element to ground, thereby placing the proper weather element in the unknown leg of a bridge circuit, and (3) voltage is applied to the bridge circuit and bridge amplifier as each weather element is connected into the circuit. Thus, the call information is completed through the drum during the first 90 degree of rotation and channel identification code and the code information to be sent for each weather transducer element is connected electrically in sequence with the keying relay to be transmitted over the last 270 degrees of rotation of the sequencing drum.

The sequencing drum performs as a switch, first completing the circuit with the call letter section of the code drum to send the call letters. Then sequentially completing the circuit from each of the channel identifier and code contacts to the keying relaying coil. Since the three sets of brushes relative to the code drum are positioned 90° apart, the code information for one set of brushes is completed prior to contact of the next succeeding brushes therefore the pair of contacts on the sequence drum for the channel identifier information and for connecting the weather transducer into the circuit does not result in an overlap of information.

Figure 6:
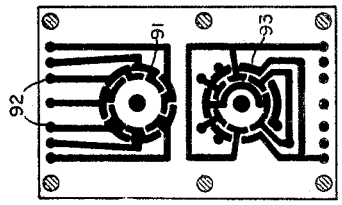
FIG. 6 is a view of the printed circuit commutator segments of the code selector unit.
Figure 8:
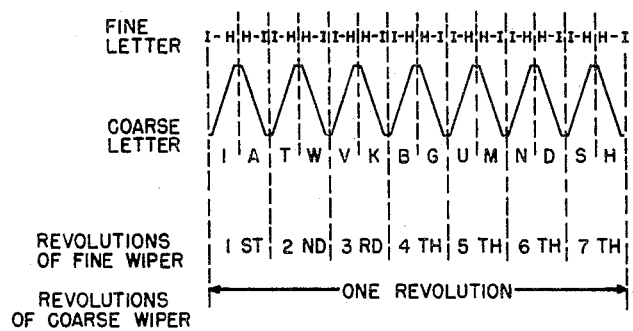
FIG. 8 illustrates the cyclic code-progression of one revolution of the commutator brush for the coarse letter commutator.
Figure 9:
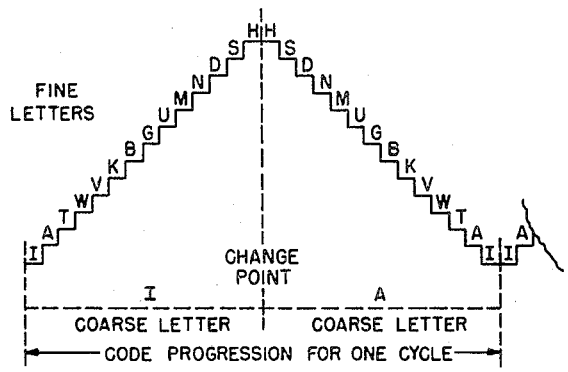
FIG. 9 illustrates the code progression of the fine letters during movement of the commutator contacts across one segment of the track.

FIG. 1 is a block diagram of the code-selector control unit and associated components. The code selector control unit is made as two separate conductive track commutators each of which provide code information that is telemetered by the overall system. Each commutator is made with two circularly aligned contact surfaces or tracks that form aligned contact segments of different radii, as shown in FIG. 6. In commutator 77, the contact surfaces of each track is provided with a common connection between contact segments 91 from which the track of greater radii extend from the common connection in a counter-clockwise direction while the contact surface of least radii extend in a clockwise direction from the common connection. Each of the separate contact segments is brought out and connected with a connector 92. In commutator 78, the circularly aligned conductive track surfaces 93 are not connected with a common connection between the two circularly aligned contacts, however, the contacts 93 are brought out to specific contact points. The contact segments from commutator 77 are electrically connected with the brush contacts 54 on the code drum 51 and the contacts from commutator 78 are connected with brush contacts 55 on the code drum 51. Servo-motor 28 drives driven gear wheels which rotate grounded brushes 81 and 82 that have two radially positioned sliding contacts for each of the separate commutators that contact the commutator contact segments.

The arrangement of the commutator segments is such that the outer circular contacts extend across the breaks in the inner circular contact. Thus, each of the sliding contacts on each of the two contact brushes 81 and 82 will always be in contact with one commutator segment on either of the circular contacts and at times each of the two brush contacts will contact a commutator conductor on the outer and inner conductor circles respectively.

The gear train 94 that rotates the radially positioned sliding brushes that contact the separate commutator segments drives a balancing potentiometer 95. The balancing potentiometer is connected in the Wheatstone bridge circuit 27 which includes sequentially one of the weather transducers in an "unknown" leg of the bridge. The potentiometer balances the circuit for the respective value of each of the weather transducers 29–33 as the particular weather transducers are connected into the circuit through contacts 75a by rotation of the sequencing drum. Since the balancing potentiometer is driven by the same gear arrangement 94 that rotates the commutator brushes, the commutator brushes will stop at a particular position on the commutator segments when the bridge circuit is balanced. The contacts made by each of the commutators 77 and 78 then sets the code that will be sent through the code drum to the keying relay.

The Wheatstone bridge measures the resistance of the particular weather transducer selected by the sequencing drum. The bridge in the illustrated device operates on 115 volts, 115 c.p.s., requiring a current of about 16 milliamperes and has an output impedance of about 7500 ohms and generates a signal of not more than 12 volts in an open circuit. The bridge circuit comprises two fixed legs and two variable legs. Each of the variable legs includes a fixed resistor in series with the transducer variable resistor. Thus, the combined resistance of the fixed resistor and the variable resistance of a weather transducer in series therewith in one leg should equal the combined resistance of the fixed resistor and balancing potentiometer in the adjacent leg. The variable resistance of each transducer is connected into the unknown leg of the bridge by the contacts 75a on the sequencing drum, or multiplexer, in proper order as the sequence drum is rotated by the drum motor 50 and the associated gear train 97.

The encoder converts the position of the potentiometer and consequently the position of the commutator brushes to Morse code. The servo-motor drives the fine-character-brush shaft 101 through a gear ratio of about 7 to 1. The fine-character-brush shaft has a gear wheel thereon which drives a gear wheel on the coarse-character-brush shaft 102 through a gear ratio of about 7.2 to 1. The coarse-character-brush shaft drives the potentiometer 95 through a gear ratio of about 8 to 9. The servo-motor 28 drives the potentiometer until a null is reached in the Wheatstone bridge for the particular weather transducer in the circuit. The potentiometer position is then converted to Morse code from the locations of the two different brush commutators on the commutators 77 and 78. One character is selected by the brush contacts from each commutator. The gear ratio between the coarse-character-brush drive and the fine-character-brush drive is such that the fine-character-brush drive rotates through a complete sequence of fourteen digits a complete revolution while the coarse-character-brush rotates through one digit on the commutator 77. This is similar to the relationship of a second hand to a minute hand of a watch. Each commutator is set up for fourteen digits, therefore the system may produce 196 two character words. circuit is arranged such that the grounded commutator segment or segments are utilized as the output. This output is in the form of contact closures between a common ground and the segments on the two commutators. The number of digits may be greater or less by changing the contact segments as desired.

transducer selected by the sequencing drum, thus the brush contacts for the code drum send information from the code drum through the sequencing drum to the keying relay coil such that the information code indicated on the code selector unit commutators is transmitted through the code drum and the sequencing drum to the keying relay coil wherein the information is transmitted by radio to a receiver remote from the weather station. During the time that the code drum has completed three revolutions sending code information of one selected weather transducer, the sequencing drum has rotated sufficient to select the second or next successive weather transducer, thus the contact is made between the second weather transducer placing the second weather transducer in the bridge circuit. Shortly after placing the second weather transducer in the bridge circuit, contact on the sequencing drum is made to energize the bridge amplifier and the servo-motor. The servo-motor then rotates the commutator brushes relative to the commutators simultaneous with rotation of the balancing potentiometer to balance the bridge circuit with the transducer now selected. Upon reaching a null in the bridge circuit, the servo-motor stops thus setting the commutator brushes relative to the commutators for a particular code that will be transmitted through the code drum and sequencing drum to the keying relay and through the transmitter to an outside remote receiver. The same operation follows for each of the weather transducer elements which are switched in turn by rotation of the sequencing drum. Once the information from all of the weather transducers has been transmitted, the sequencing drum has rotated a complete revolution wherein the circuits are broken both between the clock switch vernier on the code drum and ground and between the clock relay and clock through the clock switch drum, which turns the circuit off and places the instrumentation in position for the next weather information to be transmitted. The clock contiunes to run and after a specific built-in time of six hours, the clock will then make contact with the other contact A or B in the clock circuit wherein the operation is repeated to send additional information obtained during the off time by the weather indicator transducers.

Each of the weather transducer elements includes a variable resistor which is electrically connected to the circuit through the sequencing drum. The variable resistance represents the weather information in accordance to the calibration of the device which obtains the weather information. For instance, the wind direction is determined by the amount of resistance in the variable resistance line of the wind direction instrument. The wind speed is also indicated by the position of a movable contact on a variable resistance which has been calibrated to measure wind speed. The pressure transducer is of a type which moves a contact across a resistance line in accordance to the pressure in the pressure chamber. It has been determined that the indicator of the pressure chamber gets struck at times therefore a mechanical vibrator 103 has been built into a separate electrical circuit which operates just prior to the time of sending the pressure information. The mechanical vibrator operates to insure that the pressure contact is in the correct position to indicate the true pressure. Such a vibrator may be a motor which has a cam on the shaft in which the cam operates a mechanical element to vibrate the pressure contact movable arm to prevent sticking.

The code drum, sequencing drum, and clock switch drum are each made with specific conductor segments or rings depending on whether a continuous track is necessary or not. The call code generating portion of the code drum is made with conductive surfaces with a specific arrangement to send specific call letters for specific weather stations. In this manner, a listening station will know from which weather station the weather information is being sent. Each weather station has its own code for identification purposes. The code arrangement for each of the different weather transducers can be made the same since the same information is desired from each different weather station.

The code drum, sequencing drum, and clock switch drum may be made from a metallic surface drum in which the contacts or code bits are machined in the surface by cutting away the metal except in the contact areas, the parts machined out are filled or potted with a plastic filler to provide a smooth nonconductive surface for travel of the contact brushes. The surface may be made by a photo-etching process or by use of printed circuits without departing from the invention. The conductive surfaces (bits and spaces) are equal to provide the same outputs.

Figure 7:
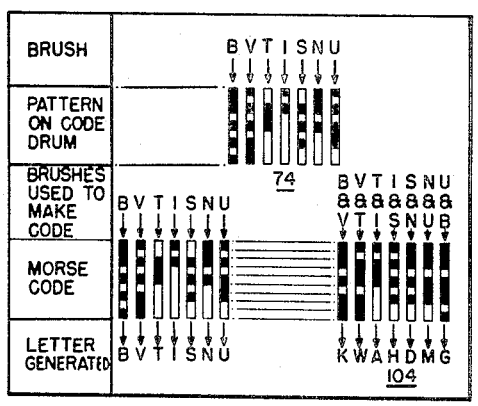
FIG. 7 illustrates the code made by the code drum.

FIG. 7 illustrates the code information formed on the code drum and the letter formed by the brushes that contact the code bits. When the commutator contact points contact only one of the commutator segments, Morse code letters such as shown in 74 are transmitted. When the contact points contact two of the segments, then combinations of the code on the drum are transmitted as shown in 104. Thus many different arrangement of letters may be transmitted to indicate the measured weather information.

The weather sending device described herein has been described for obtaining specific weather data and telemetering the information to a remote radio receiver. Obviously additional information may be obtained and sent by use of different and/or additional transducer elements. The instrumentation has been described for a specific function and can easily be changed as desired.

Obviously many modifications and variations of the present invention are possible in the light of the above teachings. It is therefore to be understood that the invention may be practiced otherwise than as specifically described.

What is claimed is:

1. An automatic weather information sending device which comprises:
   a plurality of weather responsive transducer means each responsive to changes in an atmospheric condition,
   each of said transducer means including a variable resistance element adapted to be electrically connected into a branch of a balancing Wheatstone bridge circuit,
   a second variable resistance in an opposite branch of said Wheatstone bridge,
   means for moving the movable contact of said second variable resistance to balance said Wheatstone bridge when the resistance element of one of said weather transducer means is connected into the Wheatstone bridge circuit,
   a pair of separate commutator units,
   said second variable resistance contact moving means simultaneously rotating a pair of code setting commutator contacts operative to set up a code on said pair of commutator units corresponding to the weather information to be sent,
   a rotatable code drum having code contacts thereon,
   an electrical connection between said code setting commutation contacts and the code contacts on said code drum,
   a sequencing drum for sequentially connecting the variable resistance element of each of said weather responsive transducer means into the Wheatstone bridge circuit,
   an electrical connection between said code drum and said sequencing drum contacts,
   a keying relay coil electrically connected with said sequence drum for operating a transmitter,
   a transmitter for sending the code information,
   and an electrical conductor between said sequencing drum and said keying relay coil.

2. An automatic weather information sending device as claimed in claim 1 wherein:
   one of said commutator contacts rotates one-half revo-

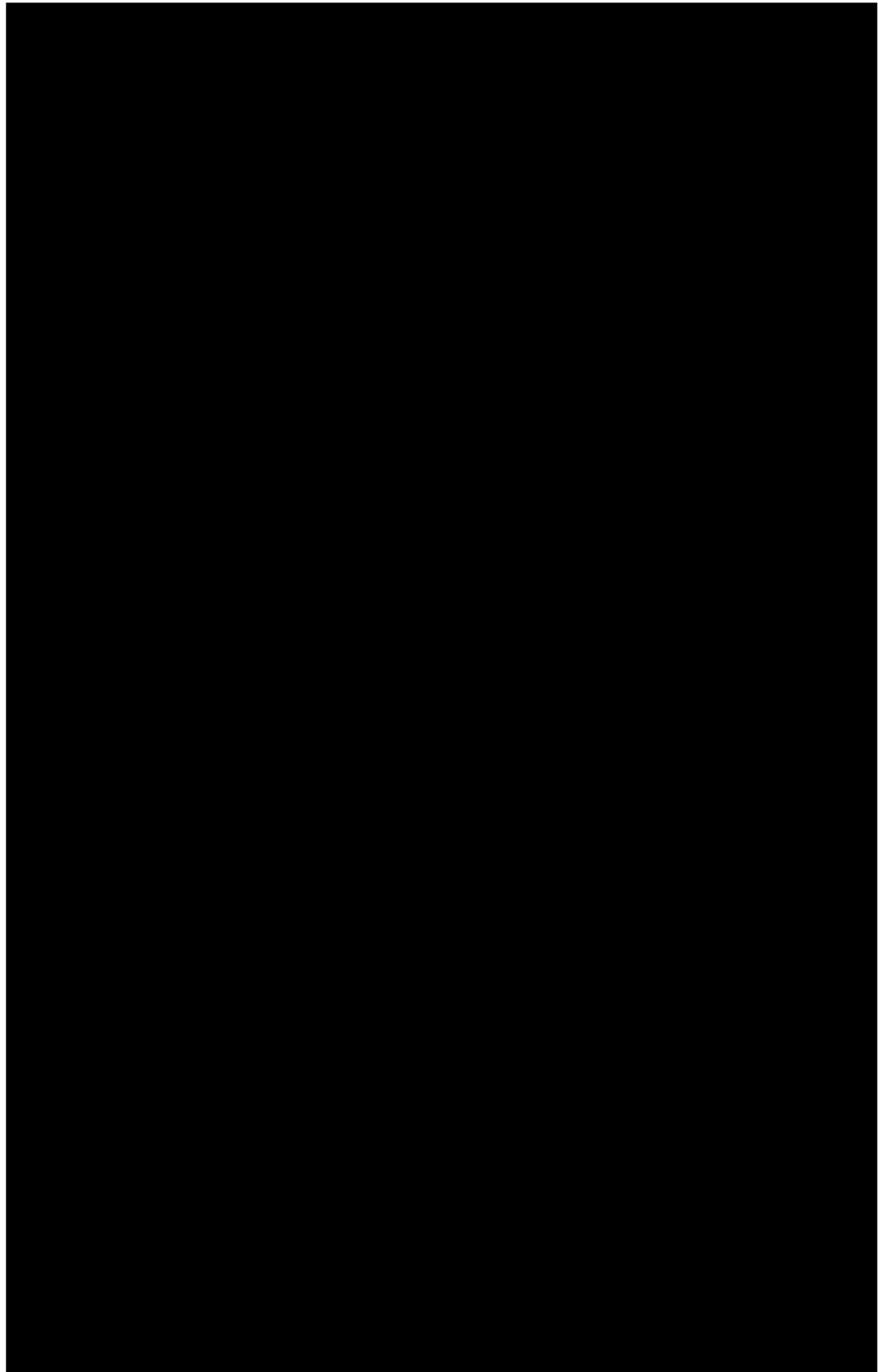

on each of said commutators and said information code section of said code drum, a sequencing drum positioned in parallel relationship to said code drum, said sequencing drum including a continuous circumferential conductive track, a call selector, an information selector, a channel identifier and weather information transducer selector, a bridge amplifier switch, and a common ground connection, an electrical connection between a common contact on said code drum and the call, information section of said sequencing drum, an electrical connection between the code section of said code drum and the call section and channel identifier section of said sequencing drum, a transmitter, a keying relay for controlling a power source to said transmitter, an electrical connection between said call, information section of said sequencing drum and said keying relay, an electrical connection between said channel selector of said sequencing drum and each of said variable resistors of said weather responsive transducer means, a clock switch drum, said clock switch drum including conductive tracks on the circumference thereof that extend circumferentially along the surface thereof, a clock, electrical connections between said clock and said contacts on said clock switch drum, an electrical connection between said clock switch drum and said clock switch vernier section on said code drum, an electrical control between said bridge amplifier switch and said motor gear means for moving the contacts of said second variable resistor, and a motor-gear means for driving said code drum, said sequencing drum and said clock switch drum whereby weather information code may be transmitted by said transmitter through said code drum, said sequencing drum, and said keying relay.

References Cited

UNITED STATES PATENTS 3,005,978   10/1961   Wapner _____ 340—187
3,032,752   5/1962   Welch _____ 340—187

THOMAS B. HABECKER, *Primary Examiner.*

U.S. Cl. X.R.

73—170; 340—183, 204, 354